Figure 1:
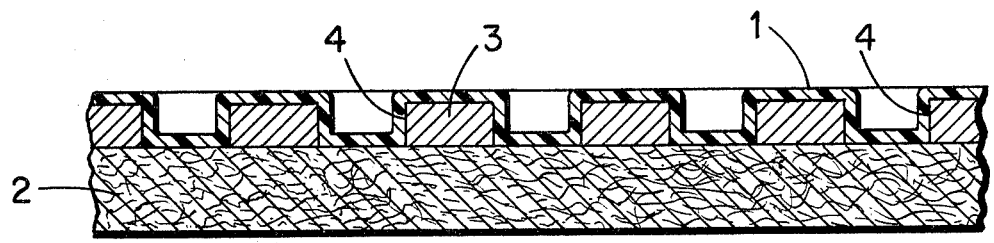

United States Patent [19]

Beghelli et al.

[11] 4,315,048

[45] Feb. 9, 1982

[54] COMPOSITE STRUCTURES BASED ON POLYOLEFIN FIBERS AND PROCESS FOR MAKING SAME

[75] Inventors: Benito Beghelli, Monza; Vincenzo De Angelis, Terni; Mauro Navone, Milan, all of Italy

[73] Assignee: Merak S.p.A., Milan, Italy

[21] Appl. No.: 129,356

[22] Filed: Mar. 11, 1980

[30] Foreign Application Priority Data

Mar. 12, 1979 [IT] Italy .............................. 20896 A/79

[51] Int. Cl.³ ................................................ B32B 3/14
[52] U.S. Cl. ......................................... 428/78; 428/95;
428/138; 428/139; 428/252; 428/285; 428/286;
428/287

[58] Field of Search ..................... 428/77, 78, 95, 138,
428/139, 285, 286, 287, 252

[56] References Cited

U.S. PATENT DOCUMENTS 4,088,805  5/1978  Wiegand ............................. 428/139

Primary Examiner—Marion McCamish

[57] ABSTRACT

Composite structures made up of a plurality of superimposed layers, one a layer of polyolefin fibers, another a polyolefin film, and the third a reinforcing element interposed between the fiber layer and the polyolefin film are disclosed, as is a particular process for making the composite structures.

4 Claims, 3 Drawing Figures

VACUUM

COMPOSITE STRUCTURES BASED ON POLYOLEFIN FIBERS AND PROCESS FOR MAKING SAME

BACKGROUND OF THE INVENTION

Composite structures consisting of a layer of fibers, either as such or in the form of non-woven fabric, mats, etc., adhered to a reinforcing element or base such as wood, paper, paperboard, metal, plastic material, etc., are known and generally used as coating panels and furnishing articles.

The manufacture of such known composite structures is time-consuming and rather complex and, in consequence, the finished structure is generally expensive. Furthermore, it is not always possible to obtain a perfect adhesion between the fabric layer and reinforcing element, especially when said element is a metal foil, such as an iron or steel foil.

THE PRESENT INVENTION

One object of this invention is to provide a composite structure comprising polyolefin fibers but which, while having the same esthetic characteristics and resistance of the known structures referred to hereinabove and being useful for the same purposes, can be made at a low cost.

This and other objects which will be apparent to those skilled in the art are accomplished by this invention which provides composite structures comprising:

(a) a layer of polyolefin fibers, either alone or blended with other natural, artificial and/or synthetic fibers, in the form of fabrics including velvets, non-woven fabrics, mats, carpets, tufted carpets or the like;

(b) an unoriented polyolefin film having a thickness of from 50 to 2,500 microns; and (c) a reinforcing element interposed between the fiber layer and the polyolefin film, said element having dimensions which are smaller than those of the fiber layer and being provided with a plurality of holes or openings through which the polyolefin film contacts and is heat-set to the fiber layer (a).

The reinforcing element having the plurality of holes and length and width dimensions smaller than those of the fiber layer to which it is bonded may be a metal foil, such as iron, steel, aluminum, copper, etc., or it may be a wire gauze or net.

The reinforcing element may also be a sheet of stiff plastic material, or paperboard, wood, a rigid or flexible structure consisting of or comprising glass fibers, etc.

Particularly suitable polyolefin fibers and films for use in practicing this invention are those prepared from polypropylene consisting prevailingly of isotactic macromolecules and obtained by stereospecific polymerization of propylene.

The process for making the present composite structure based on polyolefin fibers, and which constitutes an aspect of this invention, comprises heating the polyolefin film, preferably by infrared rays, coupling together, without any extraneous adhesive, the heated polyolefin film, the reinforcing element and the polyolefin fiber layer, with the reinforcing element interposed between the polyolefin film and polyolefin fiber layer, and using conventional apparatus, and then subjecting the resulting aggregate to vacuum forming. Owing to the action exerted by the vacuum, the film passes through the holes of the reinforcing element and along the edges thereof, thus contacting the fiber layer and adhering to it at their points of contact. In the composite structure so obtained, the reinforcing element adheres firmly to the fiber layer.

Figure 2:
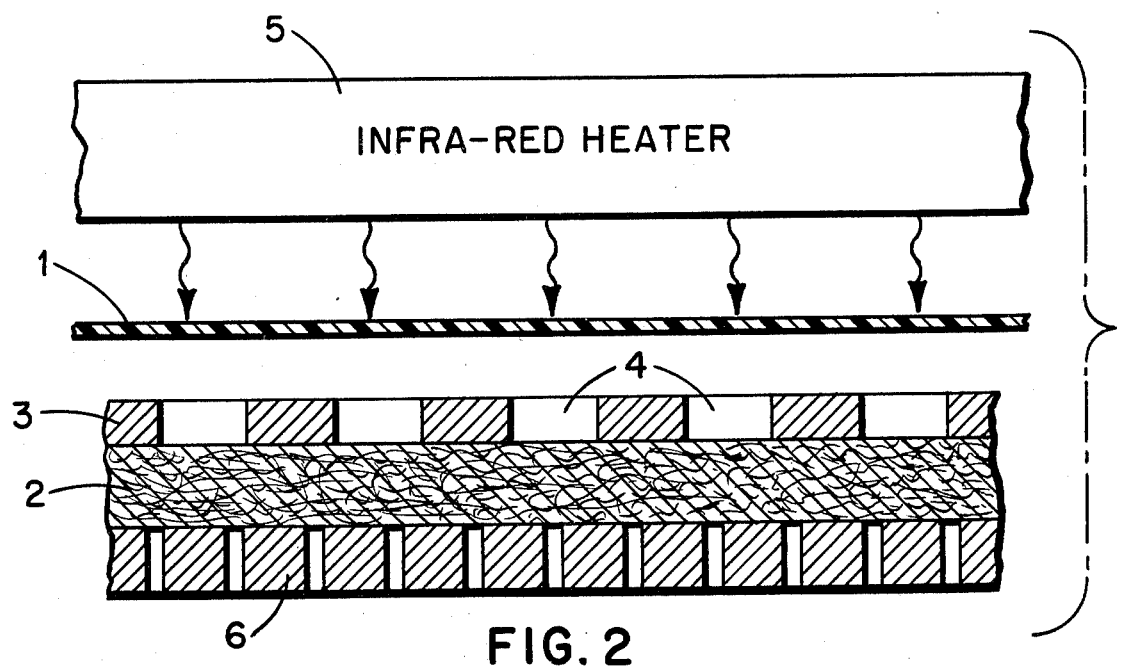
Figure 3:
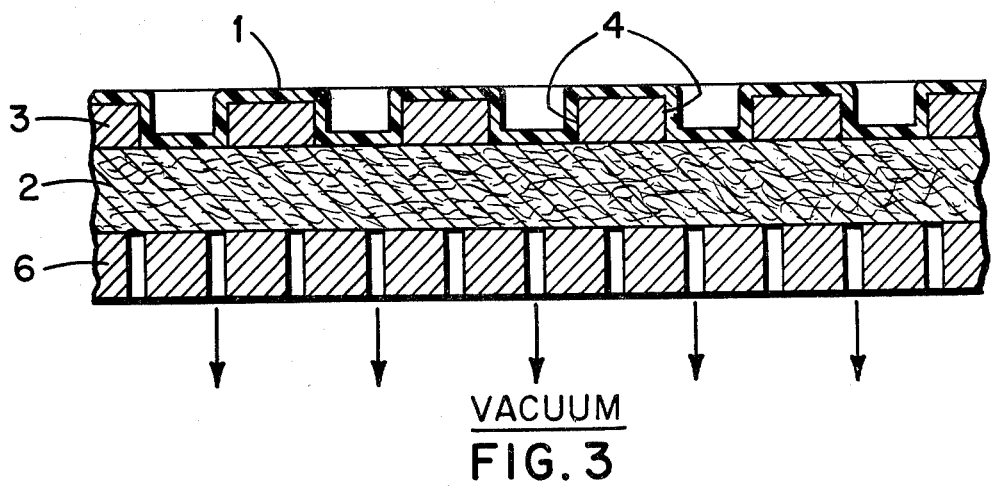

Apparatus which can be used in making the composite structures of the invention is shown in the appended drawing, in which FIG. 1 is a cross-section of a composite structure according to the invention;

FIG. 2 is an exploded view of the components of the composite structure before the coupling; and FIG. 3 is a schematic showing of a device for carrying out the vacuum forming.

In the drawing, 1 is the polyolefin film, 2 is the fiber layer, 3 is the reinforcing element having holes 4. The film 1 is heated to the softening temperature of the polyolefin by infrared rays from source 5, then coupled with the reinforcing element 3 and the fiber layer 2. The resulting aggregate is thereafter positioned on a support 6 of a vacuum-forming apparatus and subjected to vacuum applied in the direction of the arrows.

Under the action of the vacuum, film 1 passes through the holes 4 of the reinforcing element 3 and contacts the fiber layer 2, to which it welds due to the action of heat.

The composite structures of the invention, the reinforcing element 3 of which is firmly adhered to the fiber layer 2, are particularly suitable for use as panels or furnishing articles, either rigid or semi-rigid, especially in automotive vehicles, as well as for coating metal or plastic piping, and are highly sound-proof and heat-insulating.

The following examples are given to illustrate the invention in more detail and are not intended to be limiting.

EXAMPLE 1

Proceeding as shown in FIGS. 2 and 3 of the drawing, a composite structure was prepared by superimposing:

(a) a non-woven fabric weighing 500 g/m², prepared from polypropylene fibers having a count of 17 dtex;

(b) a reinforcing metal element consisting of a 6 mm thick aluminum foil about 1 cm. shorter and narrower than the non-woven fabric and provided with a plurality of holes each having a diameter of about 4 mm., and (c) an unoriented polypropylene film having a thickness of 600 microns and obtained by extrusion of polypropylene consisting predominantly of isotactic macromolecules and having a melt index of 2, residue after extraction with heptane of 97.3%, ash content of 68 ppm.

The polypropylene film was plasticized by infrared rays from the source 5 shown in FIG. 2 and the thus bonded articles were subjected to a vacuum forming treatment as shown in FIG. 3. The final composite structures so prepared are characterized by the following properties:

thickness: 10.5 mm
weight: 3,100 g/m² and are particularly suitable for applications in the furnishing field, e.g.; in automotive vehicles, and for the manufacture of panels for indoor use.

EXAMPLE 2

Proceeding as shown in FIGS. 2 and 3 of the drawing, a composite structure was prepared by superimposing:

(a) a non-woven fabric having a weight of 450 g/m², consisting of a blend of 60% of polypropylene fibers with a count of 6.7 dtex and 40% of polyamide fibers (nylon 6.6) with a count of 6.7 dtex;

(b) a 8–9 mm mesh reinforcing net consisting of iron wires with a diameter of 0.8 mm and about 1 cm. shorter and narrower than the non-woven fabric; and (c) an unoriented polypropylene film having a thickness of 300 microns and obtained by extrusion of a polypropylene prevailingly consisting of isotactic macromolecules and having a melt index of 2, a residue after extraction with heptane of 97.3%, an ash content of 68 ppm.

After plasticizing the polyolefin film by infrared rays from a source 5 as shown in FIG. 2, the bonded articles were subjected to a vacuum forming treatment as shown in FIG. 3.

The resulting composite structures are characterized by the following properties:
  thickness: 4.5 mm
  weight: 1.600 g/m²,
and are particularly suitable for applications in the furnishing field, in the motor-car industry and for the manufacture of panels for indoor use.

What we claim is:

1. A composite structure comprising:

(a) a layer of fibers comprising polyolefin fibers and which is in the form of a fabric, a non-woven fabric, a mat, or a carpet;

(b) an unoriented polyolefin film having a thickness of 50 to 2,500 microns; and (c) interposed between the fiber layer and the polyolefin film, a reinforcing element selected from the group consisting of metal foils, metal nets, stiff plastic sheets, paperboard and structures comprising glass fibers, said reinforcing element having smaller dimensions than the fiber layer and being provided with a plurality of holes through which the polyolefin film contacts the fiber layer and is heat-set to it.

2. A composite structure according to claim 1, characterized in that the fiber layer is a blend of polyolefin fibers and fibers of at least one of the group consisting of natural, artificial and synthetic fibers different from said polyolefin fibers.

3. A composite structure according to claim 1, characterized in that the polyolefin film is a film of polypropylene consisting prevailingly of isotactic macromolecules.

4. Use of a composite structure according to claim 1, as panels, furnishing articles, and pipe coatings.

* * * * *